J. S. HULL,
Assignor of one-half to A. E. Woods and one-fourth to F. G. Palmer.
LAMP.
No. 9,843. Reissued Aug. 16, 1881.
Fig. 1.
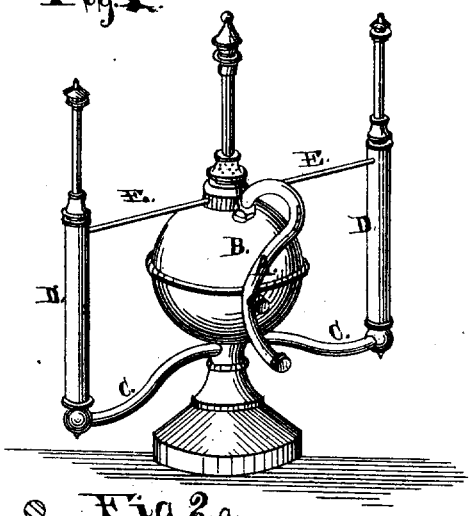
Fig. 2a.
Fig. 2b.
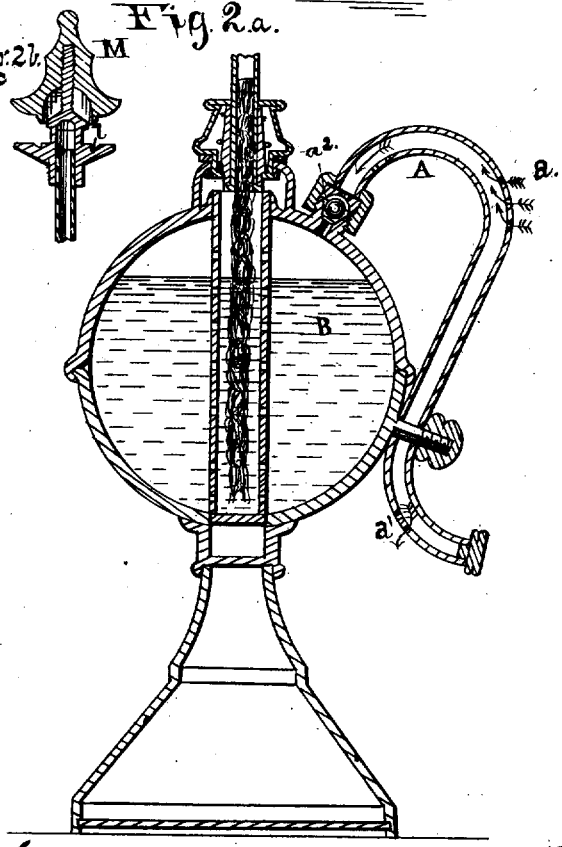
Witnesses:
H. Clay Smith.
W. A. Bertram
Inventor:
JOHN S. HULL.
by C. D. Williams.
Attorney.
N. PETERS, Photo-Lithographer, Washington, D. C.

UNITED STATES PATENT OFFICE.

JOHN S. HULL, OF BALTIMORE, MARYLAND, ASSIGNOR OF ONE-HALF TO ALEXINA E. WOODS, OF SAME PLACE, AND ONE-FOURTH TO FRANKLIN G. PALMER, OF PHILADELPHIA, PENNSYLVANIA.

LAMP.

SPECIFICATION forming part of Reissued Letters Patent No. 9,843, dated August 16, 1881.

Original No. 146,341, dated January 13, 1874. Application for reissue filed March 17, 1880.

*To all whom it may concern:*

Be it known that I, JOHN S. HULL, of Baltimore city, State of Maryland, formerly of Cincinnati, Hamilton county, State of Ohio, have invented certain new and useful Improvements in Lamps; and I hereby declare the same to be fully, clearly, and exactly described as follows, reference being had to the accompanying drawings, in which—

Figure 1 is a perspective view of a lamp embodying my present invention. Fig. $2^b$ is a central sectional view of the burner-tip; Fig. $2^a$, a vertical sectional view of the oil-reservoir in the plane of the handle.

My invention has reference to that general class of lamps in which the oil-reservoir proper is situated at some distance from the wick tube or receptacle which is fed with oil from the main reservoir through a tube connecting the two; and it consists, generically, in a lamp having an independent oil-reservoir and a wick tube or receptacle, which latter is provided with a vent-tube extending outwardly therefrom, as and for the purpose hereinafter set forth.

Specifically, my invention consists, further, in certain features and details of construction, which are made the subjects of the annexed claims.

Lamp-explosions are conceded to be due to the formation of explosive gases or mixtures of gases in the chamber below the burner, which gases or gaseous vapors are generated from the burning fluid by the heat of the metallic burner and adjacent parts.

It is the object of my invention to provide a vent-duct, as herein set forth, for these explosive gases or vapors leading from the wick-chamber of a lamp having an independent reservoir to the outer air and opening at a point sufficiently remote from the burner to prevent the ignition of the escaping gases.

In the accompanying drawings, B is the main oil-reservoir, mounted upon a suitable base, and is provided with a handle, A. This handle is hollow and is laterally perforated, as shown at *a*. It opens into the oil-reservoir B, near the top, and in the joint or connection is located a valve, $a^2$. The lower seat of the valve is grooved, so that when the lamp is upright the air or gases may pass freely in either direction; but the seat above the valve in the end of the handle A is conical, and the upper side of the valve is formed to fit therein. As a consequence of this construction, should the lamp be overturned the valve falls into the upper seat and closes the passage, preventing the escape of oil. The handle is provided with a small hole, *a'*, for the discharge of any fluid which may gather in the handle.

From the lower portion of the independent oil-reservoir B lead one or more tubes, C, to the wick tubes or receptacles D, through which tube C the oil is fed to the wicks.

From the upper portion of the wick-tubes extend lateral ducts E, through which any gases or vaporized hydrocarbons have free egress. These tubes serve also to supply air to the chambers in the wick-tube beneath the burner. They open into the upper portion of the independent oil-reservoir B, and thereby subserve two important ends—viz., any oil volatilized by the heat of the burner and condensed in its escape through the tubes E is carried into the reservoir B, and no escape of oil through the tubes can take place should the lamp be upset.

It will be readily understood, however, that these functions of the tube or tubes E are purely incidental to the fact that they connect the upper portions of the independent oil-reservoir and the wick-tubes.

Any desired number of wick-tubes D may be connected to the independent oil-reservoir B, as set forth.

The lamp is shapely, symmetrical, and attractive in appearance, and the wick-tube being of small diameter, but little shade is thrown about the base of the same. This feature is, however, common to all lamps of its class.

The burner shown in Fig. $2^b$ consists of a flanged cap-piece, *l*, perforated for the passage of the gas, and having a threaded vertical stem on which the tip M is screwed. The size of the openings is altered as the tip M is raised or lowered.

With the lamp constructed as described explosions are practically impossible, and all danger of escape of oil and its ignition, should the lamp be overturned, is obviated.

What I claim is—

1. A lamp having an independent reservoir and a wick-chamber connected with it by an oil-supply tube, and vent-tube adapted to supply air to and vent gases from the wick-tube chamber, substantially as and for the purposes set forth.

2. A lamp consisting of an independent reservoir and a wick-tube communicating with the same for the passage of the oil, said wick-tube being provided with a vent-tube which communicates with the outer air and extends outwardly for a sufficient distance to prevent the vapor from mingling with the flame, all substantially as herein set forth.

3. A lamp consisting of an independent oil-reservoir and a wick-tube in communication therewith, and having a vent-tube opening to the upper portion of the wick-tube and attached to the oil-reservoir, the said vent-tube serving to establish communication between the outer air and the wick-tube, as set forth.

4. A lamp having a vented independent oil-reservoir and a wick-tube, provided with an outwardly-extending vent-tube, as and for the purpose set forth.

5. The combination of a vented oil-reservoir, a separate wick-tube, a feed-tube connecting said reservoir and wick-tube, and an air and gas tube connecting the interiors of said wick-tube and reservoir above the surface of the oil therein, substantially as specified.

6. A lamp-reservoir having a valved vent opening into its upper portion, the valve being normally open, but arranged to close automatically as the lamp is overturned, as set forth.

7. A lamp having a hollow-handle opening into its oil-reservoir near the top, and provided with air-openings, and a valve constructed and operating as set forth.

8. A lamp whose oil-reservoir and wick-tube are in communication with each other, and also with the outer air, the latter through the medium of an opening having an automatically-operating valve, as set forth.

JOHN S. HULL.

Witnesses:
R. D. WILLIAMS,
H. CLAY SMITH.